United States Patent
Ros et al.

(10) Patent No.: US 12,145,849 B2
(45) Date of Patent: Nov. 19, 2024

(54) LENGTH-SELECTIVE DIELECTROPHORETIC MANIPULATION OF SINGLE-WALLED CARBON NANOTUBES

(71) Applicants: ARIZONA BOARD OF REGENTS ON BEHALF OF ARIZONA STATE UNIVERSITY, Scottsdale, AZ (US); Christoph Schmidt, Cary, NC (US)

(72) Inventors: Alexandra Ros, Phoenix, AZ (US); Mohammad Towshif Rabbani, Tempe, AZ (US); Christoph Schmidt, Cary, NC (US)

(73) Assignees: ARIZONA BOARD OF REGENTS ON BEHALF OF ARIZONA STATE UNIVERSITY, Scottsdale, AZ (US); Christoph Schmidt, Cary, NC (US)

( * ) Notice: Subject to any disclaimer, the term of this patent is extended or adjusted under 35 U.S.C. 154(b) by 192 days.

(21) Appl. No.: 17/722,106

(22) Filed: Apr. 15, 2022

(65) Prior Publication Data

US 2022/0332583 A1 Oct. 20, 2022

Related U.S. Application Data

(60) Provisional application No. 63/175,264, filed on Apr. 15, 2021.

(51) Int. Cl.
 *C01B 32/172* (2017.01)
 *B03C 5/02* (2006.01)

(52) U.S. Cl.
 CPC ............ *C01B 32/172* (2017.08); *B03C 5/022* (2013.01); *C01B 2202/02* (2013.01); *C01B 2202/06* (2013.01)

(58) Field of Classification Search
 CPC . C01B 2202/02; C01B 2202/06; C01B 32/00; C01B 32/159; C01B 32/162;
 (Continued)

(56) References Cited

U.S. PATENT DOCUMENTS 8,383,061 B2 * 2/2013 Prakash ............... G01N 1/2035
 422/68.1
11,160,911 B2 * 11/2021 Anand ................. A61M 1/1656
 (Continued)

FOREIGN PATENT DOCUMENTS

WO   WO-0223163 A1 *  3/2002 ........ B01L 3/502715
WO   WO-2008124211 A2 * 10/2008 ............ B82Y 30/00

OTHER PUBLICATIONS

Nakano, A. et al. "Protein dielectrophoresis: advances, challenges, and applications." Electrophoresis 34.7 (2013): 1085-1096.
(Continued)

*Primary Examiner* — Terrell H Matthews
(74) *Attorney, Agent, or Firm* — Michael Best & Friedrich LLP

(57) ABSTRACT

Systems & methods for sorting single-walled carbon nanotubes (SWNTs) using an iDEP-based sorting device. The device includes an inlet channel with a constriction and the inlet channel splits into multiple different channels after the constriction—the multiple channels includes a center channel and at least one side channel. A sample is introduced into the iDEP sorting device containing a plurality of SWNTs of different lengths suspended in a fluid. An electrical field is applied to the sample between a first electrode in the center channel and a second electrodes at a proximal end of the inlet channel. The applied electrical field causes longer SWNTs to move towards the side channels while the shorter SWNTs move towards the center channel. Accordingly, a first plurality of shorter SWNTs is then collected from the
(Continued)

1 mm center channel and a second plurality of longer SWNTs is collected from the at least one side channel.

13 Claims, 4 Drawing Sheets

(58) Field of Classification Search
CPC .......... C01B 32/172; B03C 5/00; B03C 5/02; B03C 5/022
USPC ...................................................... 209/127.1
See application file for complete search history.

(56) References Cited

U.S. PATENT DOCUMENTS

| | | | |
|---|---|---|---|
| 11,173,487 B2 | 11/2021 | Ros et al. | |
| 2008/0067068 A1* | 3/2008 | Li | B03C 5/005 204/601 |
| 2008/0185057 A1* | 8/2008 | Prakash | F16L 55/00 137/594 |
| 2014/0090979 A1* | 4/2014 | Terray | B01L 3/502784 204/601 |
| 2022/0072542 A1 | 3/2022 | Ros et al. | |
| 2022/0112079 A1 | 4/2022 | Ros et al. | |
| 2022/0332583 A1* | 10/2022 | Ros | C01B 32/162 |

OTHER PUBLICATIONS

Nanot, S.; et al. "Optoelectronic Properties of Single-Wall Carbon Nanotubes." Advanced Materials 24.36 (2012): 4977-4994.
O'Connell, Mi.J., et al. "Band gap fluorescence from individual single-walled carbon nanotubes." Science 297.5581 (2002): 593-596.
Park, Y ., et al. "Improving the functionality of carbon nanodots: doping and surface functionalization." Journal of Materials Chemistry A 4.30 (2016): 11582-11603.
Peng, H., et al. "Dielectrophoresis field flow fractionation of single-walled carbon nanotubes." Journal of the American Chemical Society 128.26 (2006): 8396-8397.
Pethig, R. "Dielectrophoresis: Status of the theory, technology, and applications." Biomicrofluidics 4.2 (2010): 022811.
Rabbani, M. T., et al. "Length-Selective Dielectrophoretic Manipulation of Single-Walled Carbon Nanotubes." Analytical Chemistry 92.13 (2020): 8901-8908.
Rabbani, M. et al. "Single-walled carbon nanotubes probed with insulator-based dielectrophoresis." Analytical chemistry 89.24 (2017): 13235-13244.
Rabbani, M. T.; et al. In 21st International Conference on Miniaturized Systems for Chemistry and Life Sciences, MicroTAS 2017; Oct. 22-26, 2017, Savannah, GA; Chemical and Biological Microsystems Society: San Diego, CA, 2020; pp. 1342-1343.
Rabbani, M. et al. "Carbon nanotube dielectrophoresis: Theory and applications." Electrophoresis 41.21-22 (2020): 1893-1914.
Regtmeier, J., et al. "Electrodeless dielectrophoresis for bioanalysis: Theory, devices and applications." Electrophoresis 32.17 (2011): 2253-2273.
Sayes, C. M., et al. "Functionalization density dependence of single-walled carbon nanotubes cytotoxicity in vitro." Toxicology letters 161.2 (2006): 135-142.
Shokrieh, M. M., et al. "Investigation of nanotube length effect on the reinforcement efficiency in carbon nanotube based composites." Composite Structures 92.10 (2010): 2415-2420.
Singh, B. P., et al. "Effect of length of carbon nanotubes on electromagnetic interference shielding and mechanical properties of their reinforced epoxy composites." Journal of nanoparticle research 16.1 (2014): 1-11.
Sonker, M., et al. "Separation phenomena in tailored micro-and nanofluidic environments." Annual Review of Analytical Chemistry 12 (2019): 475-500.

Srivastava, S. K., et al. "DC insulator dielectrophoretic applications in microdevice technology: a review." Analytical and bioanalytical chemistry 399.1 (2011): 301-321.
Stevie, F. A.; et al. In Introduction to Focused Ion Beams: Instrumentation, Theory, Techniques and Practice; Giannuzzi, L. A.; Stevie, F. A., Eds.; Springer US: Boston, MA, 2005; pp. 53-72.
Sun, Z., et al. "Quantitative evaluation of surfactant-stabilized single-walled carbon nanotubes: dispersion quality and its correlation with zeta potential." The Journal of Physical Chemistry C 112.29 (2008): 10692-10699.
Tanaka, T., et al. "Simple and scalable gel-based separation of metallic and semiconducting carbon nanotubes." Nano Letters 9.4 (2009): 1497-1500.
Tans, S. J., et al. "Room-temperature transistor based on a single carbon nanotube." Nature 393.6680 (1998): 49-52.
Tay, Feh, et al. "Particle manipulation by miniaturised dielectrophoretic devices." Defence Science Journal 59.6 (2009): 595.
Tian, Y., et al. "Tailoring the diameter of single-walled carbon nanotubes for optical applications." Nano Research 4.8 (2011): 807-815.
Tunuguntla, R. H., et al. "High-yield synthesis and optical properties of carbon nanotube porins." The Journal of Physical Chemistry C 121.5 (2017): 3117-3125.
Vetcher, A. A., et al. "Fractionation of SWNT/nucleic acid complexes by agarose gel electrophoresis." Nanotechnology 17.16 (2006): 4263.
Voldman, J. "Electrical forces for microscale cell manipulation." Annual review of biomedical engineering 8.1 (2006): 425-454.
Wan, H., et al. "Effect of CNT length and CNT-matrix interphase in carbon nanotube (CNT) reinforced composites." Mechanics Research Communications 32.5 (2005): 481-489.
Wang, X. X., et al. "Preparation and electrochemical performance of ultra-short carbon nanotubes." Journal of Power Sources 186.1 (2009): 194-200.
Wang, X., et al. "Effect of carbon nanotube length on thermal, electrical and mechanical properties of CNT/bismaleimide composites." Carbon 53 (2013): 145-152.
Wind, S. J., et al. "Vertical scaling of carbon nanotube field-effect transistors using top gate electrodes." Applied Physics Letters 80.20 (2002): 3817-3819.
Wong, E. W., et al. "Nanobeam mechanics: elasticity, strength, and toughness of nanorods and nanotubes." science 277.5334 (1997): 1971-1975.
Yang, S., et al. "A comparative study of electrochemical properties of two kinds of carbon nanotubes as anode materials for lithium ion batteries." Electrochimica Acta 53.5 (2008): 2238-2244.
Yao, Z., et al. "High-field electrical transport in single-wall carbon nanotubes." Physical Review Letters 84.13 (2000): 2941.
Zhang, Q., et al. "Iterative dipole moment method for the dielectrophoretic particle-particle interaction in a dc electric field." Journal of nanotechnology 2018, 3539075.
Zheng, M., et al. "Structure-based carbon nanotube sorting by sequence-dependent DNA assembly." Science 302.5650 (2003): 1545-1548.
Zheng, M. et al. "Enrichment of single chirality carbon nanotubes." Journal of the American Chemical Society 129.19 (2007): 6084-6085.
Zhou, W., et al. "Structural characterization and diameter-dependent oxidative stability of single wall carbon nanotubes synthesized by the catalytic decomposition of CO." Chemical Physics Letters 350.1-2 (2001): 6-14.
Abdallah, B. G., et al. "Dielectrophoretic sorting of membrane protein nanocrystals." ACS nano 7.10 (2013): 9129-9137.
Abdallah, B. G., et al. "High throughput protein nanocrystal fractionation in a microfluidic sorter." Analytical chemistry 87.8 (2015): 4159-4167.
Arnold, M. S., et al. "Sorting carbon nanotubes by electronic structure using density differentiation." Nature nanotechnology 1.1 (2006): 60-65.
Baik, S., et al. "Using the selective functionalization of metallic single-walled carbon nanotubes to control dielectrophoretic mobility." The Journal of Physical Chemistry B 108.40 (2004): 15560-15564.

(56) References Cited

OTHER PUBLICATIONS

Baughman, R. H., et al. "Carbon nanotubes—the route toward applications." science 297.5582 (2002): 787-792.
Bhattacharya, S., et al. "Insulator-based dielectrophoretic single particle and single cancer cell trapping." Electrophoresis 32.18 (2011): 2550-2558.
Boghossian, A. A., et al. "Near-Infrared Fluorescent Sensors based on Single-Walled Carbon Nanotubes for Life Sciences Applications." ChemSusChem 4.7 (2011): 848-863.
Camacho-Alanis, F., et al. "Transitioning streaming to trapping in DC insulator-based dielectrophoresis for biomolecules." Sensors and Actuators B: Chemical 173 (2012): 668-675.
Çetin, B. et al. "Dielectrophoresis in microfluidics technology." Electrophoresis 32.18 (2011): 2410-2427.
Chen, G., et al. "Diameter control of single-walled carbon nanotube forests from 1.3-3.0 nm by arc plasma deposition." Scientific Reports 4.3804: 1.
Cheng, J., et al. "Influence of carbon nanotube length on toxicity to zebrafish embryos." International journal of nanomedicine 7 (2012): 3731.
Cherukuri, P., et al. "Near-infrared fluorescence microscopy of single-walled carbon nanotubes in phagocytic cells." Journal of the American Chemical Society 126.48 (2004): 15638-15639.
Cherukuri, T. K., et al. "Length-and defect-dependent fluorescence efficiencies of individual single-walled carbon nanotubes." ACS nano 6.1 (2012): 843-850.
Chou, C.-F., et al. "Electrodeless dielectrophoresis of single-and double-stranded DNA." Biophysical journal 83.4 (2002): 2170-2179.
Cummings, E. B., et al. "Dielectrophoresis in microchips containing arrays of insulating posts: theoretical and experimental results." Analytical chemistry 75.18 (2003): 4724-4731.
Dai, H., et al. "Nanotubes as nanoprobes in scanning probe microscopy." Nature 384.6605 (1996): 147-150.
Ding, J., et al. "Concentration of Sindbis virus with optimized gradient insulator-based dielectrophoresis." Analyst 141.6 (2016): 1997-2008.
Duque, J. G., et al. "Diameter-dependent solubility of single-walled carbon nanotubes." ACS nano 4.6 (2010): 3063-3072.
Fagan, J. A., et al. "Centrifugal length separation of carbon nanotubes." Langmuir 24.24 (2008): 13880-13889.
Fakhri, N., et al. "High-resolution mapping of intracellular fluctuations using carbon nanotubes." Science 344.6187 (2014): 1031-1035.
Falvo, M. R., et al. "Bending and buckling of carbon nanotubes under large strain." Nature 389.6651 (1997): 582-584.
Fiedler, S., et al. "Dielectrophoretic sorting of particles and cells in a microsystem." Analytical chemistry 70.9 (1998): 1909-1915.
Franklin, A. D., et al. "Length scaling of carbon nanotube transistors." Nature nanotechnology 5.12 (2010): 858-862.
Gagnon, Z. R. "Cellular dielectrophoresis: applications to the characterization, manipulation, separation and patterning of cells." Electrophoresis 32.18 (2011): 2466-2487.
Gan, L., et al. "Six-helix bundle and triangle DNA origami insulator-based dielectrophoresis." Analytical chemistry 85.23 (2013): 11427-11434.
Heller, D. A., et al. "Concomitant length and diameter separation of single-walled carbon nanotubes." Journal of the American Chemical Society 126.44 (2004): 14567-14573.
Hellmich, W., et al. "Poly (oxyethylene) based surface coatings for poly (dimethylsiloxane) microchannels." Langmuir 21.16 (2005): 7551-7557.
Hersam, M. C. "Progress towards monodisperse single-walled carbon nanotubes." Nature nanotechnology 3.7 (2008): 387-394.
Hilton, S. H., et al. "A mathematical model of dielectrophoretic data to connect measurements with cell properties." Analytical and bioanalytical chemistry 411.10 (2019): 2223-2237.
Holzel, R., et al. "Trapping single molecules by dielectrophoresis." Physical review letters 95.12 (2005): 128102.
Hong, S., et al. "Electrical transport characteristics of surface-conductance-controlled, dielectrophoretically separated single-walled carbon nanotubes." Langmuir 23.9 (2007): 4749-4752.
Huang, X., et al. "High-resolution length sorting and purification of DNA-wrapped carbon nanotubes by size-exclusion chromatography." Analytical Chemistry 77.19 (2005): 6225-6228.
Jones, P. V., et al. "Differentiation of *Escherichia coli* serotypes using DC gradient insulator dielectrophoresis." Analytical and bioanalytical chemistry 406.1 (2014): 183-192.
Jones, P. V., et al. "Biophysical separation of *Staphylococcus epidermidis* strains based on antibiotic resistance." Analyst 140.15 (2015): 5152-5161.
Jones, P. V., et al. "Continuous separation of DNA molecules by size using insulator-based dielectrophoresis." Analytical chemistry 89.3 (2017): 1531-1539.
Jones, P. V., et al. "Blood cell capture in a sawtooth dielectrophoretic microchannel." Analytical and bioanalytical chemistry 401.7 (2011): 2103-2111.
Kang I. et al. "A carbon nanotube strain sensor for structural health monitoring Smart Mater." Struct 15.3 (2006): 737-748.
Kang, J., et al. "Controlling the carbon nanotube-to-medium conductivity ratio for dielectrophoretic separation." Langmuir 25.21 (2009): 12471-12474.
Kim, D. et al. "Dielectrophoresis: From molecular to micrometer-scale analytes." Analytical chemistry 91.1 (2018): 277-295.
Kim, Y., et al. "Dielectrophoresis of surface conductance modulated single-walled carbon nanotubes using catanionic surfactants." The Journal of Physical Chemistry B 110.4 (2006): 1541-1545.
Komatsu, N. et al. "A comprehensive review on separation methods and techniques for single-walled carbon nanotubes." Materials 3.7 (2010): 3818-3844.
Krupke, R. et al. "Separation techniques for carbon nanotubes." Advanced Engineering Materials 7.3 (2005): 111-116.
Krupke, R., et al. "Separation of metallic from semiconducting single-walled carbon nanotubes." Science 301.5631 (2003): 344-347.
Lapizco-Encinas, B. H. "On the recent developments of insulator-based dielectrophoresis: A review." Electrophoresis 40.3 (2019): 358-375.
Lei, U., et al. "Review of the theory of generalised dielectrophoresis." IET nanobiotechnology 5.3 (2011): 86-106.
Li, J., et al. "Highly-ordered carbon nanotube arrays for electronics applications." Applied physics letters 75.3 (1999): 367-369.
Luo, J., et al. "Insulator-based dielectrophoresis of mitochondria." Biomicrofluidics 8.2 (2014): 021801.
McEuen, P. L. "Single-wall carbon nanotubes." Physics World 13.6 (2000): 31.
Morgan, H. et al. "Separation of submicron bioparticles by dielectrophoresis." Biophysical journal 77.1 (1999): 516-525.
Nakano, A., et al. "Immunoglobulin G and bovine serum albumin streaming dielectrophoresis in a microfluidic device." Electrophoresis 32.17 (2011): 2314-2322.

* cited by examiner

| Separation Type | Parameter | Measuring Modality | Sample A | Sample B |
|---|---|---|---|---|
| Before Fractionation | $\zeta$ (mV) | DLS | -49.7 ± 1.3 | -19.8 ± 1.7 |
| | length (nm) | DLS | 324.5 ± 16.6 | 932.3 ± 34.0 |
| | length (nm) | AFM | 366.9 ± 16.8 | 1145.7 ± 435.0 |
| After Fractionation (side outlets) | $\zeta$ (mV) | DLS | -23.6 ± 4.5 | -10.7 ± 1.7 |
| | length (nm) | DLS | 506.2 ± 26.3 | 1245.3 ± 239.1 |
| | length (nm) | AFM | 581.0 ± 253.0 | 1462.2 ± 412.8 |
| After Fractionation (Center Outlet) | $\zeta$ (mV) | DLS | -51.3 ± 0.7 | -51.8 ± 4.0 |
| | length (nm) | DLS | 278.8 ± 4.5 | 309.0 ± 24.8 |
| | length (nm) | AFM | 288.8 ± 139.3 | 449.2 ± 139.3 |

LENGTH-SELECTIVE DIELECTROPHORETIC MANIPULATION OF SINGLE-WALLED CARBON NANOTUBES

RELATED APPLICATIONS

This application claims the priority benefit of U.S. Provisional Patent Application No. 63/175,264, filed on Apr. 15, 2021 and entitled "LENGTH-SELECTIVE DIELECTROPHORETIC MANIPULATION OF SINGLE-WALLED CARBON NANOTUBES," the entire contents of which are hereby incorporated by reference.

BACKGROUND

The present invention relates to systems and methods for sorting particles and/or structures. In some implementations, the invention relates to systems and methods for sorting single-walled carbon nanotubes by length.

SUMMARY

Single-walled carbon nanotubes (SWNTs) possess unique physical, optical, and electrical properties with great potential for future nanoscale device applications. Common synthesis procedures yield SWNTs with large length polydispersity and varying chirality. Electrical and optical applications of SWNTs often require specific lengths, but the preparation of SWNTs with the desired length is still challenging. Insulator-based dielectrophoresis (iDEP) integrated into a microfluidic device has the potential to separate SWNTs by length. Semiconducting SWNTs of varying length suspended with sodium deoxycholate (NaDOC) show unique dielectrophoretic properties at low frequencies (<1 kHz) that were exploited here using an iDEP-based microfluidic constriction sorter device for length-based sorting. Specific migration directions in the constriction sorter were induced for long SWNTs (≥1000 nm) with negative dielectrophoretic properties compared to short (≤300 nm) SWNTs with positive dielectrophoretic properties. We report continuous fractionation conditions for length-based iDEP migration of SWNTs, and we characterize the dynamics of migration of SWNTs in the microdevice using a finite element model. Based on the length and dielectrophoretic characteristics, sorting efficiencies for long and short SWNTs recovered from separate channels of the constriction sorter amounted to >90% and were in excellent agreement with a numerical model for the sorting process.

In some implementations, the systems and methods described herein provide a microfluidic device utilizing an insulator-based dielectrophoretic (iDEP) technique for sorting single-walled nanotubes (SWNTs). The unit functions by producing inhomogeneous (non-uniform) electric field gradients that are utilized to move the SWNTs based on its dielectrophoretic (DEP) properties along with molecular lengths (long≥1000 nm and short≤300 nm versions) as a processing step. These implementations provide a cost-effective and reliable method to separate the SWNTs by size as a means to purify them through charge (attraction/repulsion) arrangement from their respective dipole moments.

In one embodiment, the invention provides an iDEP sorting device for sorting single-walled carbon nanotubes by length. The device includes an inlet channel with a constriction where the cross-sectional area of the inlet channel is reduced, a center channel, and at least one side channel. The inlet channel splits into multiple channels after the constriction—the multiple channels include the center channel and the at least one side channel. An electrode is positioned in the center channel and an electrical field source is configured to apply an electrical field between the electrode and a proximal end of the inlet channel.

In another embodiment, the invention provides a method of sorting single-walled carbon nanotubes using an iDEP-based sorting device. The iDEP-based sorting device includes an inlet channel with a constriction where the cross-sectional area of the inlet channel is reduced at the constriction and the inlet channel splits into multiple different channels after the constriction—the multiple channels includes a center channel and at least one side channel. A sample is introduced into the iDEP sorting device containing a plurality of single-walled carbon nanotubes of different lengths suspended in a fluid. An electrical field is applied to the sample between a first electrode in the center channel and a second electrode at a proximal end of the inlet channel. The applied electrical field causes longer SWNTs to move towards the side channels while the shorter SWNTs move towards the center channel. Accordingly, a first plurality of shorter SWNTs is then collected from the center channel and a second plurality of longer SWNTs is collected from the at least one side channel.

Other aspects of the invention will become apparent by consideration of the detailed description and accompanying drawings.

DETAILED DESCRIPTION

Figure 1A:
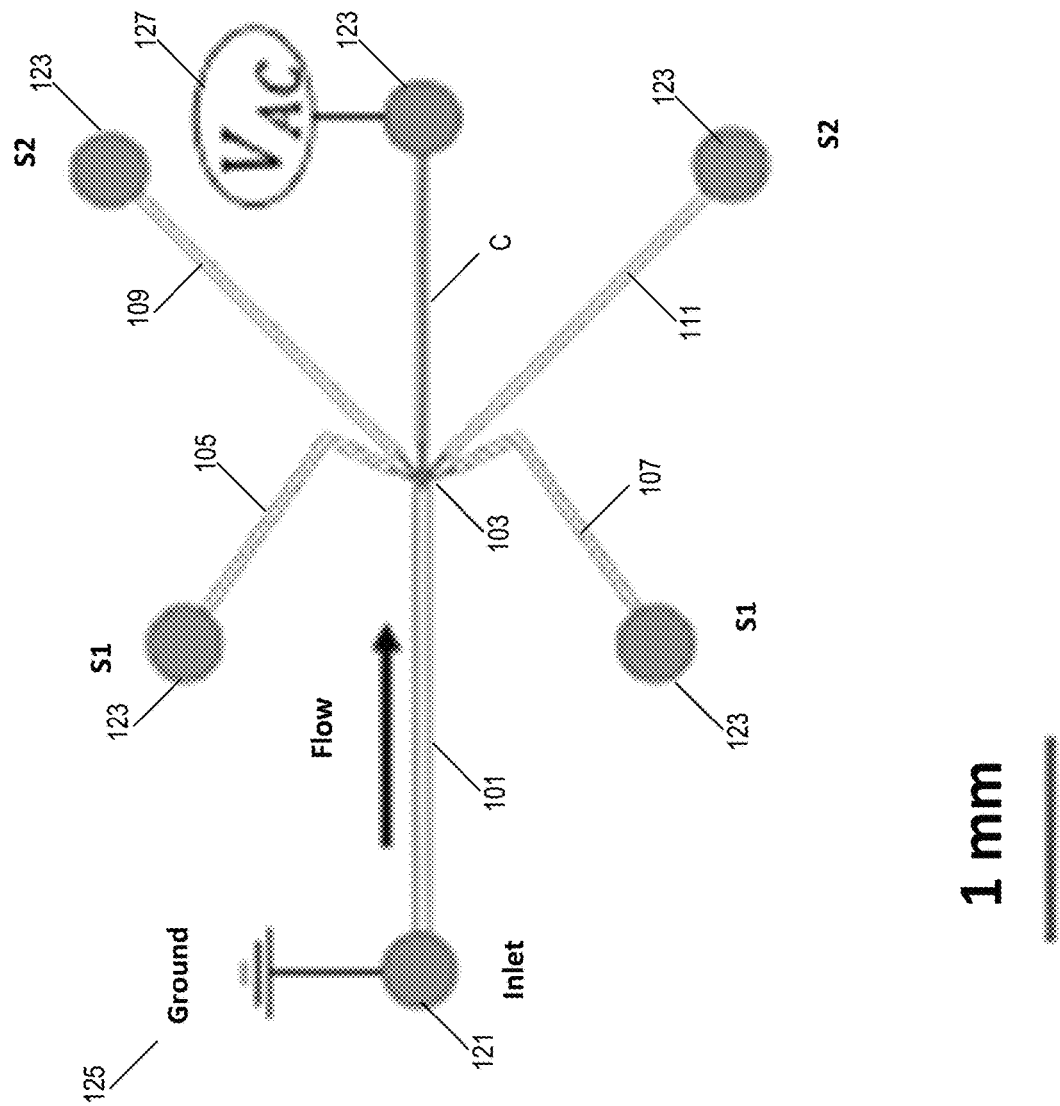
FIG. 1A is a schematic diagram of an iDEP-based sorter according to one example. The suspended SWNT sample is introduced via the inlet reservoir and channel. The sample flows through the channel toward a constriction region leading to five outlet branches which are labeled as $S_1$ and $S_2$ for the two side outlets and C for the center outlet.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Applications of single-walled carbon nanotubes (SWNTs) in nanotechnology require the understanding of their unique mechanical, electrical, optical, and structural properties. Metallic SWNTs are promising for the field of nanoscale electronics, while semiconducting SWNTs can open the door for field-effect Schottky-type transistor applications, nanometer size devices, biological transporters, and biosensors. Due to their high photostability and unique fluorescence emission in the IR range, where autofluorescence in biological samples is minimal, SWNTs are also employed as mechanical sensors in living cells. Their structural and chemical properties have also led to applications as atomic force microscopy (AFM) probes.

An important factor for SWNT applications is the length of the SWNT. For example, in some implementations, there is a direct correlation of SWNT and multiwall carbon nanotube (MWNT) length with electrical and/or thermal conductivities. In addition, SWNT-based field-effect transistors have the potential to replace silicon technologies. The length of SWNTs has a strong impact on the performance of such transistors. Also, the mechanical, thermal, electrical, and electromagnetic properties of MWNT-based epoxy resins depend on carbon nanotube length. SWNT length is important for reinforcing nanocomposites, because the length of the SWNT affects both the Young's modulus and the load transfer between SWNTs and matrix. Similarly, variations/improvement in the Young's modulus of SWNT composites is negligible when the length of the SWNT is less than 100 nm and only SWNTs with lengths greater than 1000 nm reinforce the polymer matrix significantly. Furthermore, in some implementations, CNTs may be used as an electrode material in Li-ion batteries and as catalyst support in fuel cells. However, short CNTs (i.e., CNTs with a length less than 300 nm) provide better electrochemical performance during charging and discharging than longer CNTs. Also, the reversible capacities of long CNTs may be half of those of short CNTs. In addition, the charge-transfer resistance of long CNTs can be much higher than those of short carbon nanotubes. Furthermore, the toxicity of functionalized MWNTs can be influenced by nanotube length. SWNT cytotoxicity studies revealed that the degree of functionalization is responsible for the cytotoxic response of cells in a cell culture which also depends on the length of SWNTs. Therefore, length characterization and control of CNTs (e.g., SWNTs) are useful in some nanotube-based applications and may be helpful in achieving "green chemistry" objectives.

Despite the importance of length in SWNT applications, many synthesis methods are unable to control or regulate length of the SWNT during the synthesis process. In some implementations, the synthesis processes produce mixtures of both metallic and semiconducting SWNTs with varying chirality, a range of diameters (from ~1 nm to ~2 nm), and large variations in length (e.g., from 10 nm up to >1 cm). The high-pressure carbon monoxide (HiPCO) process, for example, is a common fabrication method yielding SWNT with diameters of ~1 nm and lengths ranging from several nanometers to several micrometers, containing more than 50 chirality types. Accordingly, samples of SWNTs produced by the HiPCO process may show broadly varying electrical and optical properties, determined at least in part by the variations in chirality. In addition, SWNTs in samples may also form adducts and bundles held together by van der Waals forces, leading to a large variety of adduct species. An alternative synthesis strategy uses a focused ion beam, but this approach is expensive and has throughput limitations. Producing SWNTs with specific lengths or chirality at high yield is still challenging. The post-synthesis processing methods described in the examples herein are, therefore, beneficial towards yielding pure SWNT fractions.

In some implementations, separation methods of SWNTs may take advantage of distinct electronic properties. For example, ultracentrifugation using density gradient methods may be used to purify SWNTs and sort them by size. This method, however, is based on specific DNA oligomers used to wrap the SWNTs, which limits large scale applications due to cost and oligomer availability. Furthermore, DNA-wrapped SWNTs have limited stability in aqueous density gradients, which would require stripping the DNA wrapping agent after separation. In other implementations, ion exchange and size-exclusion chromatography may be used as length sorting tools, and a combination of these two may be used for separation of SWNTs by chirality with similar diameters. These separation techniques also require wrapping SWNTs with DNA with similar problems with stability, cost, and unwrapping. In other implementations, electrophoresis using DC electric fields might be used as a separation tool for SWNTs based on their diameter. However, this would be more a diagnostic than a production method because recovery from gels is cumbersome. Importantly, all these methods do not offer separation of SWNTs in a continuous manner. Thus, a versatile fractionation or separation approach for SWNTs by length is still lacking.

In other implementations, dielectrophoresis (DEP) may be used for nanoparticle separation. For example, DEP may be used to capture proteins, nucleic acids, as well as other biomolecules, and also carbon nanotubes. DEP may also be employed to sort SWNTs according to their dielectric properties. When a cylindrical SWNT is introduced into a nonuniform electric field, it will experience a force due to the induced dipole moment. The DEP force acting on a cylindrically shaped SWNT can be expressed as $$\vec{F}_{DEP} = \frac{\pi r^2 l}{3} \varepsilon_m \text{Re}(CM) \nabla \left(\vec{E}\right)^2 \quad (1)$$

where r refers to the SWNT radius, l to its length, E to the electric field, and $\varepsilon_m$ to the permittivity of the suspending medium. Re(CM) denotes the frequency-dependent Clausius Mossotti factor. Depending on the sign of Re(CM), SWNTs can be attracted to or repelled from regions of high electric field strength. SWNTs experiencing positive DEP (pDEP) migrate toward the higher electric field, whereas SWNTs experiencing negative DEP (nDEP) migrate toward the lower electric field.

In some implementations, insulator-based DEP (iDEP) may be utilized to produce inhomogeneous electric field gradients. In an iDEP-based microfluidic system, when an electrical potential is applied across the channel, inhomogeneous electric field gradients are produced by the insulating geometries or constrictions introduced in the channel. iDEP offers several advantages such as simple fabrication and low cost using well established soft lithography techniques, avoiding electrode reactions within the devices. The electric field gradient can be generated along the entire depth of the device. iDEP may be used to examine DC and low-frequency DEP behavior of particles.

Studying single SWNT properties requires suspending them in solvents, and in many cases, aqueous media are preferred. However, due to strong van der Waals interactions, SWNTs often aggregate in aqueous solutions. Thus, in some implementations, SWNTs are suspended using surfactants or biomolecular wrapping agents. In some implementations, SWNTs may be successfully suspended with anionic surfactants such as sodium deoxycholate (NaDOC) or sodium dodecyl sulfate (SDS), and cationic surfactants such as cetyltrimethylammonium bromide (CTAB), ssDNA, among others. The suspension of SWNTs with different surfactants or biomolecules will eventually influence their surface charge and zeta potential ($\zeta$). At low frequencies (<1 kHz), the DEP behavior of NaDOC-suspended SWNTs mainly depends on the conductivity of the particle and the surrounding medium which, in turn, is determined by the zeta potential induced by surfactant wrapping. In this low-frequency regime, Re(CM) reduces to an expression for the particle and medium conductivity, $\sigma_p$ and $\sigma_m$ respectively, such that $Re(CM)=-1+\sigma_p/\sigma_m$. In the examples described herein, we exploit this unique DEP behavior at low frequencies to induce size-selective iDEP migration of SWNTs and exploit it for fractionation of SWNTs by length.

Chemicals. In the examples described below, sodium deoxycholate (NaDOC) for the suspension of SWNTs, N-(2-hydroxyethyl)piperazine-N'-2-ethanesulfonic acid (HEPES), and Pluronic F-108 were purchased from Sigma-Aldrich (St. Louis, MO), and sodium hydroxide (NaOH) was purchased from Merck KGaA (Darmstadt, Germany). The SYLGARD 184 silicone elastomer kit for polydimethylsiloxane (PDMS) for microdevice fabrication was obtained from Dow Corning Corporation (Midland, MI). Glass slides (48 mm×60 mm) for device assembly were purchased from Electron Microscopy Sciences (Hatfield, PA). Deionized (DI) water was produced with an Arium 611 ultrapure water system from Sartorius (Göttingen, Germany). For atomic force microscopy imaging, Muscovite Mica (V-1, sheet size 25×25 mm, thickness 0.15-0.21 mm) was purchased from Ted Pella, Inc. (Redding, CA), and (3-aminopropyl)triethoxysilane (APTES) was obtained from Sigma-Aldrich (Hamburg, Germany). A Malvern Zetasizer Nano ZS instrument (Westborough, MA) was used for surface charge measurements. Medium conductivity was measured by a Thermo Scientific Orion 3-star conductivity meter (Waltham, MA).

Microdevice Fabrication. Microfluidic constriction sorter devices were fabricated with soft lithography techniques. The microfluidic chip layout and channel structures were designed using AutoCAD software (Autodesk, San Rafael, CA) which was used to construct a chrome photomask (Photo Sciences, Inc., Torrance, CA). The pattern was transferred to a 4-in. silicon master wafer using SU-8 negative photoresist (Microchem, Westborough, MA). Then the PDMS elastomer base was mixed with curing agent at a 10:1 ratio (w/w), poured over the master wafer, and degassed for 30 min, and the PDMS cast was cured in an oven for 4 h at 80° C. The cast was subsequently peeled off the master wafer, and reservoirs were punched manually with a punch, with a 1.5 mm diameter at the inlets and 3 mm diameter at the outlets for fluidic access. The PDMS cast was cut into appropriate pieces, and these slabs and microscope glass slides were cleaned with 2-propanol and distilled water in an ultrasonic bath for 2 min, dried with nitrogen, and baked on a hot plate for 30 s at 90° C. The PDMS slab and glass slides were then treated with oxygen plasma in a plasma cleaner oven (PDC-001: Harrick Plasma cleaner/sterilizer, Ithaca, NY) at high RF (18 W) for 30 s. Both surfaces were then brought into contact, and the device was irreversibly bonded with the glass slide to create fluid channels. The channels were washed several times with distilled water, and then the surface was treated with Pluronic F-108 (1% w/v) and incubated overnight, as previously described. The assembled PDMS microfluidic chip had an overall length of 5 mm with a 30 µm wide constriction region; the inlet channel was 100 µm wide, and all outlets were 20 µm wide as shown in FIG. 1. All channels were ≈20 µm high.

SWNT Sample Preparation. SWNTs used for the experiments were suspended with the surfactant NaDOC. NaDOC was dissolved at a concentration of 1% (w/v) in 10 mM HEPES buffer (pH 7.2) containing 1% (w/v) F108. About 1 mg of SWNTs was carefully transferred into a clean glass scintillation vial with a spatula, and 1 mL NaDOC solution was added. To wrap and solubilize SWNTs, they were sonicated at 20 kHz at 10 W using a 2 mm microtip sonicator (Sonics & Material INC, Danbury, CT). Two types of NaDOC-coated samples were prepared with different sonication times. To obtain short SWNTs (sample A), the solution was sonicated for 60 min. After sonication, the sample was centrifuged for 10 min at 14,800 rpm. After centrifugation, the supernatant was collected for the experiments. This sample was diluted at a ratio of 10:1 with HEPES buffer containing F108. To obtain long SWNTs (sample B), the solution was sonicated for 10 s. After sonication, the SWNT suspension was transferred to an Eppendorf tube and centrifuged (Sigma 1-14 centrifuge, Germany) at 2000 rpm for 10 min. All samples were stored at 4° C. prior to the experiments.

Detection and Data Analysis. SWNT fluorescence was excited with a 561 nm solid-state laser (500 mW cw, Cobolt Jive, Cobolt) coupled through a neutral density filter (NDC-50C-4M, Thorlabs) which was used to adjust the intensity of the laser. The laser beam was directed into a high-NA objective (CFI plan-Apo IR, 60×, Nikon, Japan), and the same objective was used to collect the fluorescence light through a dichroic beam splitter (630 DCXR; AHF Analysentechnik). After the beam splitter, the fluorescence light was further filtered through a 900 nm long-pass filter (F47-900; AHF, Analysentechnik). SWNTs were imaged with an InGaAs infrared camera (XEVSSHS-1.7-320 TE-1, Xenics, Leuven, Belgium). Images were captured at a 100 ms frame time, and data analysis was performed with Micromanager software (ImageJ, version 1.52a, NIH, Bethesda, MD).

SWNT Sorting and Size Characterization. To characterize length distributions of SWNTs in samples A and B and in the fractionated samples, dynamic light scattering (DLS) was carried out with a Zetasizer Nano ZS instrument (Malvern Panalytical, Westborough, MA). During the sorting experiments, flow rates were maintained at 25 µL/h with a syringe pump (HA1100, Instech, Plymouth Meeting, PA), while a potential of 350 V was applied at a frequency of 1000 Hz. After ~3 h of sorting at optimized potential and frequency, ~20 µL SWNT sample was accumulated from the center outlet and then diluted to 1 mL with sample buffer for DLS. In addition, atomic force microscopy (AFM) was used to image SWNTs. Briefly, mica (Grade V1, 25 mm×25 mm, Ted Pella, Redding, CA) was treated with APTES, and a drop of the respective SWNT sample was incubated on the mica surface for 5 min. After incubation, the mica surface was cleaned with DI water and dried for the AFM measurements. A Cypher S AFM (Asylum Research, Goleta, CA) was used for SWNT imaging using tapping mode in air with a Si tip with a spring constant of 42 N/m and a resonance frequency of 300 kHz (AC160 TS C2, Olympus, Dusseldorf, Germany). About 35-40 nanotubes were measured for each sample to determine the average length.

Further, samples A and B were mixed and a similar fractionation experiment performed as described above. The mixed SWNT sample was prepared by adding 500 µL each of sample A and sample B in an Eppendorf tube. The mixed sample was introduced into the microdevice through the inlet reservoir with a flow rate of 25 µL/h and subjected to fractionation at 1000 Hz and with an applied potential of 350 V. To determine the separation resolution R, we quantified the fluorescence intensity along a curved line spanning the start of the outlet channels (see, e.g., line 201 in FIG. 2A) with Image G (version 1.52a), fit the data with a Gaussian in Origin software (OriginPro 2017, version 94E) and calculated R according to $R=1.18\times(x_A-x_B)/(w_A+w_B)$, where $x_A$ and $x_B$ refer to the locations of the peak maxima, and $w_A$ and $w_B$ correspond to the full width at half-maximum, respectively.

We studied the migration of SWNTs wrapped with sodium deoxycholate (NaDOC) in a continuous-flow iDEP microfluidic constriction sorter. FIG. 1A depicts the microfluidic sorter consisting of an inlet channel 101, a constriction 103, and five outlet channels. The five outlet channels include a center outlet channel C, a first S1 outlet channel 105 on a first side of a flow axis of the inlet channel 101, a second S1 outlet channel 107 on a second side of the flow axis of the inlet channel 101, a first S2 outlet channel 109 on the first side of the flow axis of the inlet channel 101, and a second S2 outlet channel 111 on the second side of the flow axis of the inlet channel 101. As illustrated in greater detail in FIGS. 1B and 1C, the five outlet channels diverge from the inlet channel 101 after the constriction 103 of the inlet channel. In this example, the center outlet channel C extends along the same flow axis as the inlet channel 101. The first and second S1 outlet channels 105, 107 divert from the inlet channel 101 on opposite sides of the flow axis of the inlet channel 101 at a first distance from the start of the constriction 103. The first and second S2 outlet channels 109, 111 divert from the inlet channel 101 on opposite sides of the flow axis of the inlet channel 101 at a second distance from the start of the constriction 103. The second distance is longer than the first such that the first and second S2 outlet channels 109, 111 each divert from the inlet channel 101 after the first and second S1 outlet channels 105, 107 (along the flow path) between the center outlet channel C and a respective S1 outlet channel 105, 107.

Figure 1C:
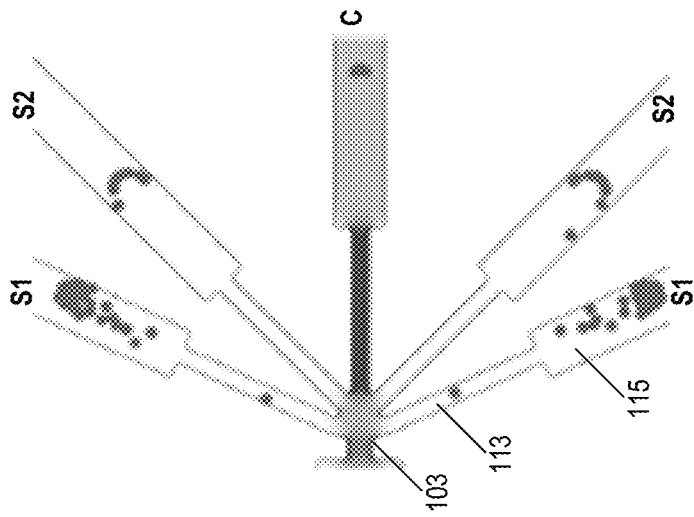
FIG. 1C is a diagram of the iDEP-based sorter of FIG. 1A showing the position of larger SWNT particles (e.g., 1000 nm in length) exhibiting negative DEP (nDEP) migrating preferentially toward the side outlets.
Figure 1B:
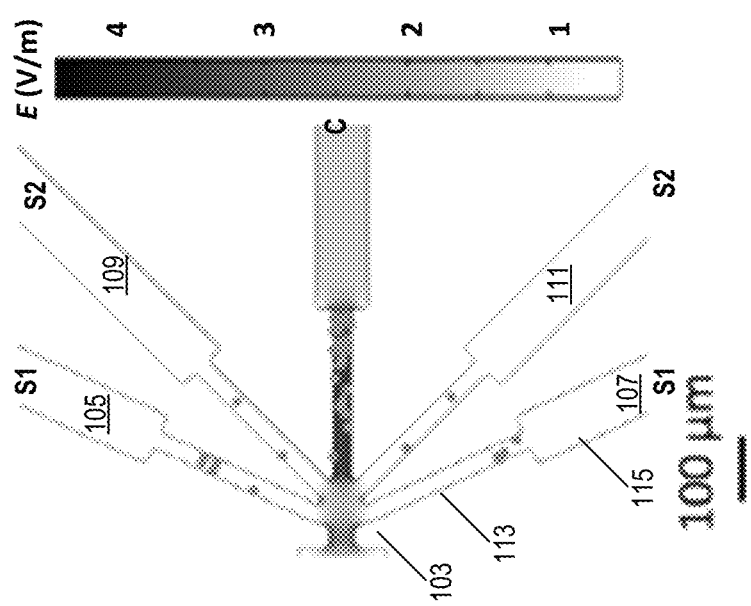
FIG. 1B is a diagram of the iDEP-based sorter of FIG. 1A showing the position of small SWNT particles (e.g., 300 nm in length) exhibiting positive DEP (pDEP) migrating toward the center outlet after migrating through the constriction.

As also illustrated in the examples of FIGS. 1B and 1C, each outlet channel C, 105, 107, 109, 111 includes a small diameter section 113 and a large diameter section 115. The small diameter section 113 for each outlet channel is positioned between the constriction 103 of the inlet channel 101 and the large diameter section 115 of the outlet channel. The small diameter sections 113 provides an extension and, in some cases, a variation of the constriction 103 in order to influence the iDEP electric field gradient of the device.

The device includes an inlet opening 121 at a proximal end of the inlet channel 101 (i.e., the end of the inlet channel 101 opposite the constriction 103). The device also includes a plurality of outlet openings 123 positioned at a distal end of each outlet channel C, 105, 107, 109, 111. The inlet opening 121 is coupled (or selectively coupleable) to an inlet reservoir (not picture) holding the fluid sample to be pumped through the device. Each outlet opening is coupled (or selectively coupleable) to a different outlet reservoir (not pictured) configured to receive the fluid sample after it has moved through the device. In some implementations, each outlet opening of the device is coupled to a different outlet reservoir (e.g., five outlet reservoirs in the example of FIGS. 1A through 1C). However, in other implementations, the outlet opening 123 for similarly positioned outlet channels on opposite sides of the flow axis of the inlet channel 101 may be coupled to the same outlet reservoir (e.g., the outlet openings 123 of the first and second S1 outlet channels 105, 107 are both coupled to a first outlet reservoir, the outlet openings 123 of the first and second S1 outlet channels 109, 111 are both coupled to a second outlet reservoir, and the outlet opening 123 of the center outlet channel C is coupled to a third outlet reservoir. In still other implementations, the outlet openings 123 for all of the outlet channels may be coupled to a single shared outlet reservoir.

A first electrode 125 is positioned in the inlet channel 101 (e.g., near the inlet opening 121 as illustrated in the example of FIG. 1A) and a second electrode 127 is positioned in the center outlet channel C (e.g., near the outlet opening 123 of the center outlet channel C as illustrated in the example of FIG. 1A). In some implementations, an electrical field is applied to the device by coupling the first electrode 125 to ground, coupling the second electrode 127 to an AC voltage source, and operating the AC voltage source to apply the electrical field between the first electrode 125 and the second electrode 127.

The unique geometry of the constriction 103 creates localized electric field nonuniformities near the constriction 103 and the outlet channels via the electrical potential applied between the inlet and outlet reservoirs (i.e., between the first electrode 125 and the second electrode 127). The electric field maximum is located in the center outlet channel and the minimum in the side outlet channels. Due to the nonuniform electric field, the resulting DEP forces deflect particles based on their length and surfactant wrapping properties into different outlets. As illustrated in the example of FIG. 1B, relatively smaller SWNTs (e.g., with lengths of approximately 500 nm) exhibit positive DEP (pDEP) and migrate towards the electrical field maximum in the center outlet channel C. Conversely, as illustrated in the example of FIG. 1C, relatively larger SWNTs (e.g., with lengths of approximately 1000 nm) exhibit negative DEP (nDEP) and migrate towards the electrical field minimum in the first and second S1 outlet channels 105, 107.

Bulk fluid transport of a SWNT suspension through the sorter device is induced by external pressure (e.g., a mechanical pump or a syringe pump configured to pump fluid from the inlet reservoir into the inlet opening 121 of the device). In some implementations, the device illustrated in the example of FIGS. 1A through 1C is operated by constant pumping of a fluid including the SWNTS suspension into the inlet opening 121 which the fluid drains through the outlet openings 123 into one or more outlet reservoirs and the applied electric field gradient causes SWNTs to be sorted in the outlet flow into each respective outlet reservoir (e.g., such that SWNTs collect in different outlet reservoirs based on length). In other implementations, the fluid sample a volume of the fluid sample is introduced into the inlet opening 121 and prevented from draining out of the device through the outlet openings 123 (e.g., by plugging/blocking the outlet openings 123 or by positioning of the outlet openings 123 above the fluid line). After the fluid is placed within the device (without any flow in or out of the device), the electric field is applied and the SWNTs move towards the various outlet channels depending on their length. The length-sorted SWNTs may then be removed from the device through the outlet openings 123 (e.g., by removing the plug and allowing the fluid to drain from the device, or by using a device such as a syringe to remove the sample fluid from each separate outlet channel).

SWNT Sample Characterization. SWNT suspensions prepared with long sonication times (>60 min) contained short SWNTs with high zeta potential, exhibiting pDEP (Re(CM)>0). In contrast, short sonication times resulted in SWNTs with lower zeta potential but increased lengths displaying nDEP (Re(CM)>0). In some experiments, two samples were prepared accordingly using different sonication times, primarily containing short (sample A) and long (sample B) SWNTs. The length distributions of samples A and B, as well as the zeta potentials, were investigated with dynamic light scattering (DLS) and atomic force microscopy (AFM) imaging as summarized in the table of FIG. 4. AFM and DLS measurements showed the average SWNT length in sample A to be 366.9±16.8 and 324.5±16.6 nm, respectively. For sample B, the average length was determined as 1145.7±435.0 nm with AFM and 932.3±34.0 nm with DLS.

Prediction of iDEP Separation of SWNTs. Based on the size distributions in the two samples and varying zeta potentials, the expected migration behavior of SWNTs is nontrivial. We therefore first conducted a numerical study to predict the SWNT migration in the constriction sorter device of FIGS. 1A through 1C. SWNT lengths from 50 to 2000 nm were studied with the numerical model, spanning the size range explored experimentally in samples A and B. FIG. 1B shows a snapshot image obtained from the numerical simulation after passage through the constriction 103 for the shorter SWNTs (i.e., —300 nm long) with pDEP properties (Re(CM)=13.44). From the inlet, 100 particles were released, and a majority of them was found in the center channel C. FIG. 1C shows the migration of the longer SWNTs (i.e., —1000 nm long) with nDEP properties (Re (CM)=—1.18). In the case of the sample containing the longer SWNTs (i.e., Sample B as illustrated in FIG. 1C), SWNTs were sorted with a preference into the side outlets where the electric field strength is lowest, which is expected for nanotubes with nDEP (Re(CM)<0). This example demonstrates that short SWNTs with pDEP properties can be sorted from large SWNTs with nDEP into different outlets.

FIG. 1B (higher particle count in the center channel) and FIG. 1C (higher particle count in side channel) show distinct migration preference into different outlets for the two selected SWNT species exhibiting variations in length and DEP properties. To quantify the preference of migration, the recovery efficiency of the S1 outlet channels 105, 107, % $E_{S1}$, was calculated based on particle counts found in each outlet channel:

$$\%E_{S1} = \frac{N_{S1}}{N_{S1} + N_{S2} + N_C} \quad (2)$$

where $N_{S1}$, $N_{S2}$, and $N_C$ are the number of particles found in the two S1 outlet channels 105, 107, the two S2 outlet channels 109, 111, and the center outlet channel C. Similarly, the efficiencies of the S2 outlet channels 109, 111 (% $E_{S2}$) and the center outlet channel (% $E_C$) were obtained. For the two cases shown in FIGS. 1B and 1C, the recovery efficiency was 83.9% in the case of 1000 nm SWNTs with nDEP for the sum of S1 and S2 outlets, and 83.1% for the 300 nm SWNTs exhibiting pDEP in the center outlet.

The numerical model allows to investigate % E for monodisperse SWNTs. To carefully map the migration behavior over a broad range of length distribution of surfactant wrapped SWNTs originating from the suspension and wrapping process, we studied % E of various SWNT lengths ranging from 50 nm up to 2000 nm with the numerical model. We studied both nDEP and pDEP properties for each SWNT length to account for well-wrapped (pDEP and high ζ) as well as such SWNT species exhibiting nDEP resulting from uncomplete wrapping and low ζ. The numerical study revealed that the sorting efficiencies in the center outlet increased for decreasing the length of SWNTs in the case of pDEP. For long SWNTs with nDEP properties, this trend is significantly different. The longer the SWNT species, the stronger their preferred migration to the side outlets (with preference for the S2 side outlets).

Experimental Observation of iDEP Separation of SWNTs. Based on this analysis, a recovery efficiency ~90.2% can theoretically be achieved for SWNTs of 50 nm length with pDEP causing preferred migration into the center outlet. SWNTs of the same size with nDEP properties, however, did not show a preferential sorting efficiency. In contrast, for a 2000 nm long SWNT with nDEP properties, a % E of ~92.9% can be achieved due to preferred migration into the four side channels combined. A general trend was observed in which longer SWNTs with nDEP properties (resultant from lower preferentially migrate into the side channels and can be sorted from larger SWNTs with pDEP properties (resultant from higher Note that experimentally, we expect improved wrapping properties, higher zeta potentials, and therefore pDEP for the shorter SWNTs, because shorter SWNTs result from longer sonication and suspension times, as further detailed below. The converse holds for longer SWNTs.

To test this length-dependent migration behavior experimentally, a microfluidic constriction sorter was employed using a sample with a majority of short SWNTs (sample A) and one with longer SWNTs (sample B). SWNTs were introduced into the microdevice through the inlet opening 121 with a syringe pump at a flow rate of 25 µL/h. In this case, SWNTs were distributed evenly in the microchannel. Next, DEP-based migration was induced by varying the applied potentials at a flow rate of 25 µL/h. No preferred migration into any outlet channel was observed below 300 V. Fractionation behavior was investigated with a frequency of 1000 Hz and an applied potential of 350 V where DEP forces were sufficiently high.

To characterize the length distribution in samples A and B, AFM imaging and DLS were used before and after the DEP migration experiments. We also characterized for each sample before and after the sorting experiment. At low frequencies, the sign of Re(CM) of semiconducting SWNTs is governed by the conductivity of the medium and the particle. While the particle conductivity is predominantly determined by the double layer contributions arising from the Stern layer and diffuse layer conductance, it is also dependent on the zeta potential of the charged particle suspended in an electrolyte. Therefore, the zeta potential has an impact on the Clausius Mossotti factor and DEP properties of SWNTs, as shown previously. For sample A (shorter SWNTs), the zeta potential was measured to be −49.7±1.3 mV prior to sorting, which is in agreement with the previous reports. For sample B (longer SWNTs), the zeta potential was measured as −19.8±1.7 mV (see also, the table of FIG. 4).

Figure 2B:
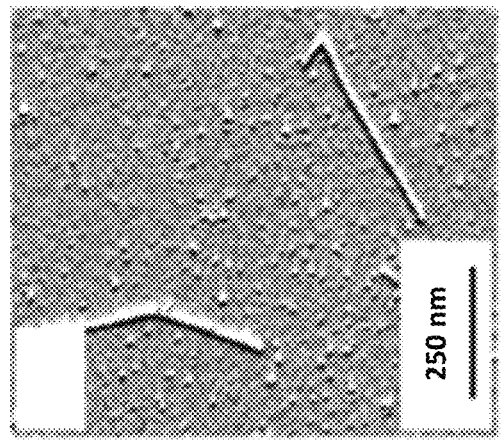
FIG. 2B is a graph of normalized fluorescence intensity in the image of FIG. 2A for all outlet channels demonstrating a higher analyte concentration in the center outlet.
Figure 2A:
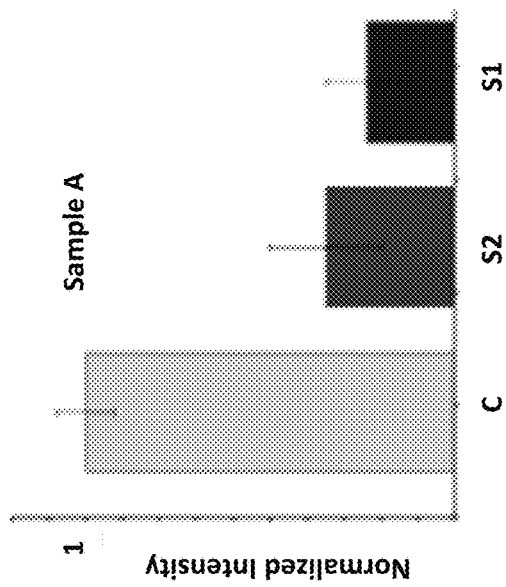
FIG. 2A is a fluorescence image showing short SWNTs in the iDEP-based sorter of FIG. 1A (at 1 kHz and 350 V) concentrating in the regions of highest electric field strength located in the center outlet channel indicative of pDEP.
Figure 2E:
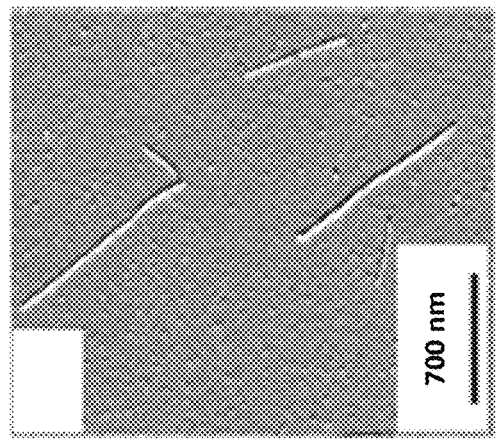
FIG. 2E is a graph of normalized fluorescence intensity in the image of FIG. 2D for all outlet channels demonstrating higher analyte concentration in the side outlets.
Figure 2D:
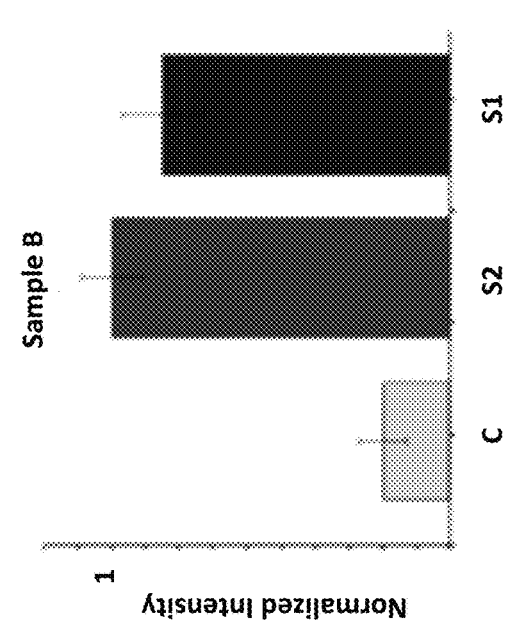
FIG. 2D is a fluorescence image showing long SWNTs in the iDEP-based sorter of FIG. 1A (at 1 kHz and 350 V) concentrating in the regions of lowest electric field strength in the side outlets indicative of nDEP.
Figure 2C:
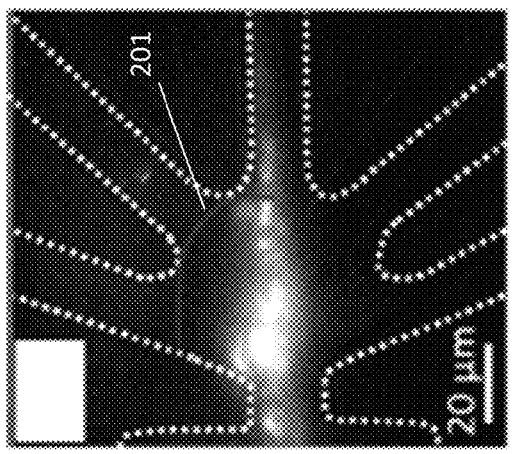
FIG. 2C is an AFM image of fractionated NaDOC-wrapped SWNTs collected from the center outlet after sorting in the example of FIG. 2A.

Both samples were subjected to fractionation in the constriction sorter, while the sorting behavior was monitored with near-infrared fluorescence microscopy. FIG. 2A shows the fractionation behavior of sample A (i.e., the shorter SWNTs) as observed during the sorting experiment, demonstrating that the majority of SWNTs migrated to the center channel, where the electric field strength was highest. This migration behavior corresponds to that predicted by the numerical model for the pDEP case for SWNT lengths ≤300 nm as demonstrated in FIG. 1B. FIG. 2B represents the normalized intensity in the different outlets, demonstrating that maximum intensity was observed in the center outlet and that the short SWNTs migrated into the center outlet. FIG. 2C shows an AFM image of NaDOC-wrapped SWNTs collected from the center outlet after 3 h of fractionation. AFM imaging revealed an average length of 288.8±139.3 nm. Consistent with this result, the DLS measurement gave an average SWNT length of 278.8±4.5 nm and $\zeta$ of −51.3±0.7 mV for the center outlet fraction. The average length after fractionation is thus slightly reduced compared to sample A before fractionation, and the zeta potential is slightly increased. The side outlet fractions from the same fractionation experiment were combined and analyzed. Both AFM (581.0±253.0 nm) and DLS (506.2±26.3 nm) indicated a larger average length than the starting sample A, and the zeta potential of −23.6±4.5 mV was considerably reduced. We attribute this outcome to the fact that the sorter was capable of fractionating the somewhat polydisperse sample A. In addition we note, that this sorting behavior is in excellent agreement with the numerical results. The table of FIG. 4 lists average lengths and values for the original and fractionated samples. We note that length distributions of SWNTs analyzed by AFM and DLS are in good agreement, although slightly higher average lengths are obtained with AFM measurements. We attribute this difference to the length weighting inherent to the DLS technique and to a systematic bias in the SWNT length determination via AFM. The latter may result from undercounting of overlapped SWNTs and preferential deposition on the surface prior to AFM imaging. However, a significance test confirmed that the two methods do not differ (p=0.05).

Figure 2F:
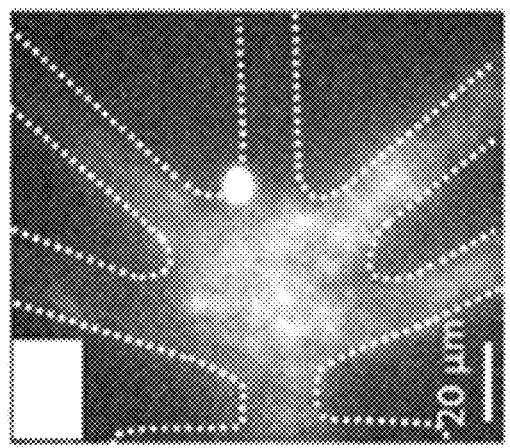
FIG. 2F is an AFM image of fractionated NaDOC-wrapped SWNTs collected from the side outlet in the example of FIG. 2D.

Next, the fractionation behavior of sample B (long SWNTs) prepared with shorter sonication time was investigated. Long SWNTs suspended by 10 s sonication have a lower zeta potential and showed nDEP characteristics in agreement with previous reports. In the sorting experiment, they preferably migrated to the low electric field regions in the side outlets, shown in FIG. 2D. This observation was confirmed by the fluorescence intensity quantification, where the highest intensity was found in the side outlets as shown in FIG. 2E. In agreement with the preferred migration of longer SWNTs with nDEP behavior into the side outlets, AFM analysis (as shown in FIG. 2F) resulted in an average length of 1462.2±412.8 nm. DLS characterization confirmed the preferred migration of long SWNTs into the side outlets and showed an average length of 1245.3±239.1 nm and $\zeta$ of −10.7±1.2 mV. The much smaller fluorescence intensity observed in the center outlet channel is attributed to smaller SWNTs with pDEP behavior migrating to the center channel, which was also confirmed by the length analysis of the fraction collected in the center outlet after sorting. Both DLS and AFM characterization revealed a shorter average length (see FIG. 4). This result is again in agreement with the numerical model for SWNTs≥1000 nm and nDEP.

The dependence of the DEP response on can be explained by the variations in surface conductance induced through the quality of the surfactant wrapping. While longer SWNTs exhibit smaller $\zeta$, the shorter SWNTs, subjected to more rigorous sonication and longer wrapping times, show high $\zeta$. The zeta potential influences the SWNT surface conduction, because it determines the magnitude of the diffuse layer conductance, $\lambda_{s,d}$, as well as the Stern layer conductance, $\lambda_{s,s}$, which both sum up to the surface conductance, $\lambda_s$. The surface conductance can be used to describe the SWNT conductivity, via $\sigma_p = 2\lambda_{sa}^{-1}$, where a is the radius, and intrinsic conductivity is neglected. A lower zeta potential then leads to lower $\lambda_s$ and consequently lower $\sigma_p$, since $\sigma_p$ governs the dielectrophoretic response of SWNTs at a given $\sigma_m$ via the Re(CM)=−1+$\sigma_p/\sigma_m$.

Figures 3, 4:
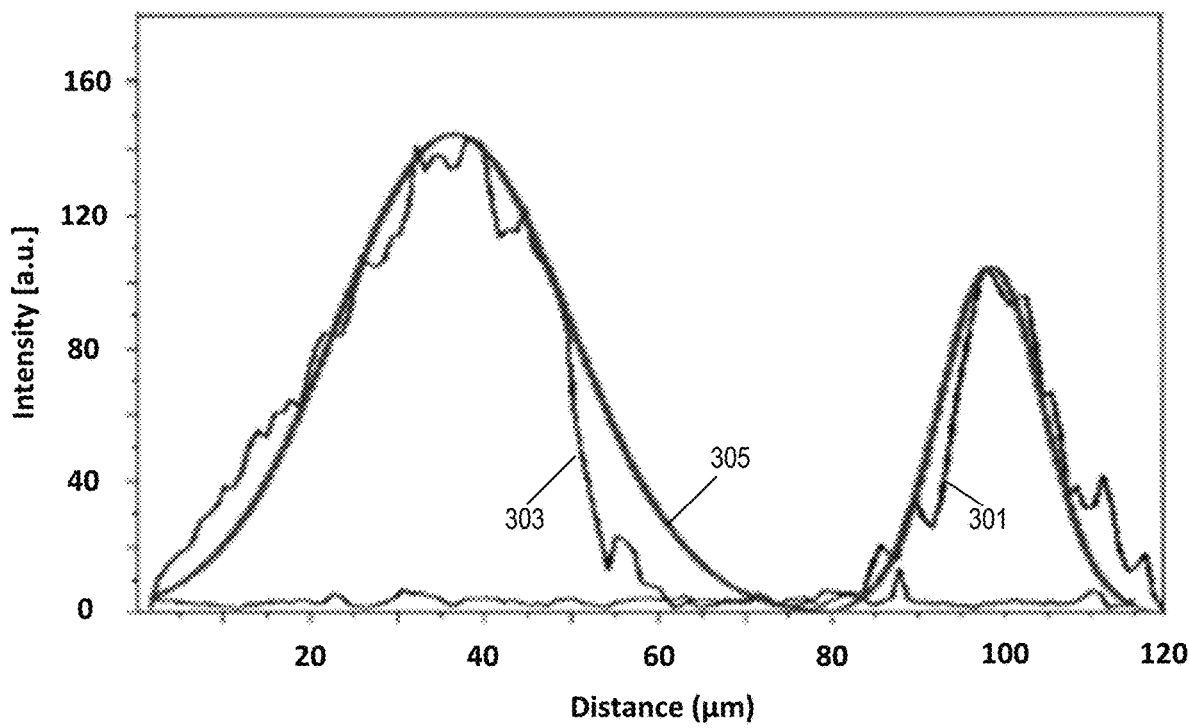
FIG. 3 is a graph of fluorescence intensity of SWNTs in two different samples (one with longer SWNTs and the other with short SWNTs) by analyzing the intensity along the curved line in FIG. 2A and the Gaussian fit for each peak, resulting in R=1.39.
FIG. 4 is a table of zeta potential and average lengths for SWNTs in the two different samples of FIG. 3.

To further characterize the resolution of the SWNT separation, we analyzed the intensity of SWNTs from samples A and B at a location close to the constriction 103, right before the start of the three types of outlet channels. For this purpose, we conducted a spatial intensity analysis along the line 201 in FIG. 2A. The intensity distributions along this line 201 are shown in FIG. 3, which allow for the calculation of R between sample A and B. In the graph of FIG. 3, line 301 indicates the fluorescence intensity from Sample A (smaller SWNTs), line 303 indicates the fluorescence intensity from Sample B (longer SWNTs), and line 305 indicates the Gaussian fit for each curve. From this analysis, the spatial separation resolution along this line resulted in 1.39.

Finally, we conducted a fractionation experiment of the entire size range, by combining samples A and B. The AFM analysis revealed an average length of 1372.3±251.6 nm in the side outlets and an average length of 366.2±221.2 nm in the center outlet. This is in very good agreement with the migration experiments carried out for the individual samples A and B, as demonstrated in the table of FIG. 4, and confirmed the working principle of the SWNT fractionation approach based on DEP at low frequency.

In summary, we conducted a study of SWNT fractionation based on the length and DEP properties using an insulator-based dielectrophoresis constriction sorter. We present a numerical model that predicts recovery efficiencies up to ~90% in selected outlets of a constriction sorter based on SWNT length and DEP properties. Experimentally, two samples differing in lengths and DEP properties showed migration behavior matching the numerical model. Long SWNTs with small zeta potentials exhibited nDEP and migrated preferably into the side outlets of the sorter. In contrast, small SWNTs with high negative zeta potentials were fractionated into the center channel. We demonstrate that the variations in zeta potential caused by surfactant wrapping and sonication time can be conveniently exploited to fractionate SWNTs by DEP. The resultant resolution for the two length distributions assessed experimentally was almost at baseline resolution demonstrating a good separation quality. The employed constriction sorter is capable of sorting SWNTs in continuous mode which is advantageous for technological applications in which larger quantities of SWNTs are required. Future optimization of the geometry of the device as well as the electrical driving parameters could further improve the length selectivity of this fractionation approach.

Certain systems methods and examples relating to the subject matter above was published in an article authored by the inventors entitled "Length-Selective Dielectrophoretic Manipulation of Single-Walled Carbon Nanotubes," Rabbani et al., *Anal. Chem.* 2020, 92, 8901-8908, the entire contents of which are incorporated herein by reference.

Accordingly, the systems and methods described above provide, among other things, length-selective dielectrophoretic manipulation of single-walled carbon nanotubes. Other features and advantages are set forth in the following claims.

What is claimed is:

1. An iDEP device for sorting single-walled carbon nanotubes by length, the iDEP device comprising:
    an inlet channel including a constriction, wherein a cross-sectional area of the inlet channel reduces at the constriction;
    a center channel;
    at least one side channel, wherein the inlet channel splits into multiple channels after the constriction, the multiple channels including the center channel and the at least one side channel;
    an electrode positioned in the center channel; and
    an electrical field source configured to apply an electrical field between the electrode and a proximal end of the inlet channel,
    wherein the inlet channel diverges from the constriction into the center channel and the at least one side channel.

2. The iDEP device of claim 1, wherein the center channel is aligned with a flow axis of the inlet channel, wherein the at least one side channel includes a first plurality of side channels on a first side of the flow axis of the inlet channel and a second plurality of side channels on a second side of the flow axis of the inlet channel.

3. The iDEP device of claim 1, wherein a width of the inlet channel before the constriction is greater than a width of the constriction of the inlet channel, wherein a width of the center channel is less than the width of the constriction of the inlet channel, wherein a width of the at least one side channel is less than the width of the constriction of the inlet channel, and wherein channels of the iDEP device are formed of an insulating material such that variations in the widths of the channels produces an electric field gradient when the electric field is applied between the electrode and the proximal end of the inlet channel.

4. The iDEP device of claim 3, wherein the width of the inlet channel before the constriction is 100 μm, wherein the width of the constriction of the inlet channel is 30 μm, wherein the width of the center channel is 20 μm, and wherein the width of the at least one side channel is 20 μm.

5. A method of sorting single-walled carbon nanotubes by length using the iDEP device of claim 1, the method comprising:
    introducing a fluid suspension of single-walled carbon nanotubes into the iDEP device at the proximal end of the inlet channel; and
    operating the electrical field source to apply the electrical field between the electrode and the proximal end of the inlet channel,
    wherein applying the electrical field to the fluid suspension causes a first plurality of single-walled carbon nanotubes to migrate towards the center channel and causes a second plurality of single-walled carbon nanotubes to migrate towards the at least one side channel, wherein an average length of the first plurality of single-walled carbon nanotubes is less than an average length of the second plurality of single-walled carbon nanotubes, and
    wherein introducing the fluid suspension into the iDEP device at the proximal end of the inlet channel includes pumping the fluid suspension into the iDEP device at the proximal end of the inlet channel at a flow rate of 25 μL/h.

6. The method of claim 5, wherein operating the electrical field source to apply the electrical field includes operating the electrical field source to apply an alternating current (AC) electrical field with a magnitude of at least 350 V between the electrode and a second electrode positioned at the proximal end of the inlet channel.

7. The method of claim 6, wherein operating the electrical field source to apply the electrical field further includes operating the electrical field source to apply the AC electrical field with a frequency of 1000 Hz.

8. The method of claim 5, further comprising preparing the fluid suspension of single-walled carbon nanotubes by:
    combining a sample of single-walled carbon nanotubes with a surfactant solution containing a surfactant diluted in a buffer fluid, and
    sonicating the fluid suspension for a predetermined period of time, wherein the predetermined period of time is selected based at least in part on a desired length of single-walled carbon nanotubes to be isolated from the sample of single-walled carbon nanotubes.

9. The method of claim 5, wherein the surfactant solution includes a sodium deoxycholate (NaDOC) surfactant diluted to a concentration of 1% in an N-(2-hydroxyethyl)piperazine-N'-2-ethanesulfonic acid (HEPES) buffer fluid.

10. The method of claim 5, wherein sonicating the fluid suspension includes sonicating the fluid suspension at 20 kHz at 10 W.

11. The method of claim 5, wherein the predetermined period of time of sonication is increased in order to isolate shorter single-walled carbon nanotubes with a length below a first threshold length by increasing the positive DEP response of the shorter single-walled carbon nanotubes, and wherein the predetermined period of time of sonication is increased in order to isolate longer single-walled carbon nanotubes with a length above a second threshold length by increasing the negative DEP response of the longer single-walled carbon nanotubes.

12. The method of claim 11, further comprising:
    removing the isolated shorter single-walled carbon nanotubes from the center channel; and
    removing the isolated longer single-walled carbon nanotubes from the at least one side channel.

13. A method of sorting single-walled carbon nanotubes, the method comprising:
    introducing a sample into an iDEP sorting device, the sample containing a plurality of single-walled carbon nanotubes of different lengths suspended in a fluid, the iDEP sorting device including
        an inlet channel including a constriction, wherein a cross-sectional area of the inlet channel reduces at the constriction;
        a center channel, and
        at least one side channel, wherein the inlet channel splits into the center channel and the at least one side channel after the constriction;
    applying an electrical field to the sample, wherein the electrical field is applied between a first electrode in the center channel and a second electrode at a proximal end of the inlet channel;
    collecting a first plurality of single-walled carbon nanotubes from the center channel; and
    collecting a second plurality of single-walled carbon nanotubes from the at least one side channel, wherein the single-walled carbon nanotubes of the first plurality have a length that is shorter than the single-walled carbon nanotubes of the second plurality.

* * * * *